United States Patent [19]

Nola

[11] Patent Number: 4,644,234
[45] Date of Patent: Feb. 17, 1987

[54] FOUR QUADRANT CONTROL CIRCUIT FOR A BRUSHLESS THREE-PHASE D.C. MOTOR

[75] Inventor: Frank J. Nola, Huntsville, Ala.

[73] Assignee: The United States of America as represented by the Administrator of the National Aeronautics and Space Administration, Washington, D.C.

[21] Appl. No.: 775,548

[22] Filed: Sep. 13, 1985

[51] Int. Cl.⁴ .............................................. H02P 6/02
[52] U.S. Cl. .................................. 318/254; 318/138; 318/439
[58] Field of Search .................. 318/138, 254 A, 254, 318/439, 376, 599, 811; 310/68 R, 102 R, 168, 171; 244/75 R, 76 A, 158 R, 176

[56] References Cited

U.S. PATENT DOCUMENTS

| | | | |
|---|---|---|---|
| 4,296,362 | 10/1981 | Beasley | 318/439 X |
| 4,368,411 | 1/1983 | Kidd | 318/254 |
| 4,390,826 | 6/1983 | Erdman et al. | 318/254 X |
| 4,494,051 | 1/1985 | Bailey | 318/439 X |
| 4,544,868 | 10/1985 | Murty | 318/811 X |

*Primary Examiner*—Charles D. Miller
*Assistant Examiner*—Bentsu Ro
*Attorney, Agent, or Firm*—Joseph H. Beumer; John R. Manning; Leon D. Wofford, Jr.

[57] ABSTRACT

A control circuit is provided for a brushless three-phase d.c. motor which affords four quadrant control from a single command. The control circuit provides acceleration of the motor in both clockwise and counterclockwise directions and braking and generation in both clockwise and counterclockwise directions. In addition to turning on individual transistors of the transistor pairs connected to the phase windings of the motor for 120° periods while the other transistor of that pair is off, the control circuit also provides, in a further mode of operation, turning the two transistors of each pair on and off alternately at a phase modulation frequency during such a 120° period. A feedback signal is derived which is proportional to the motor current and which has a polarity consistent with the command signal, such that negative feedback results.

14 Claims, 35 Drawing Figures

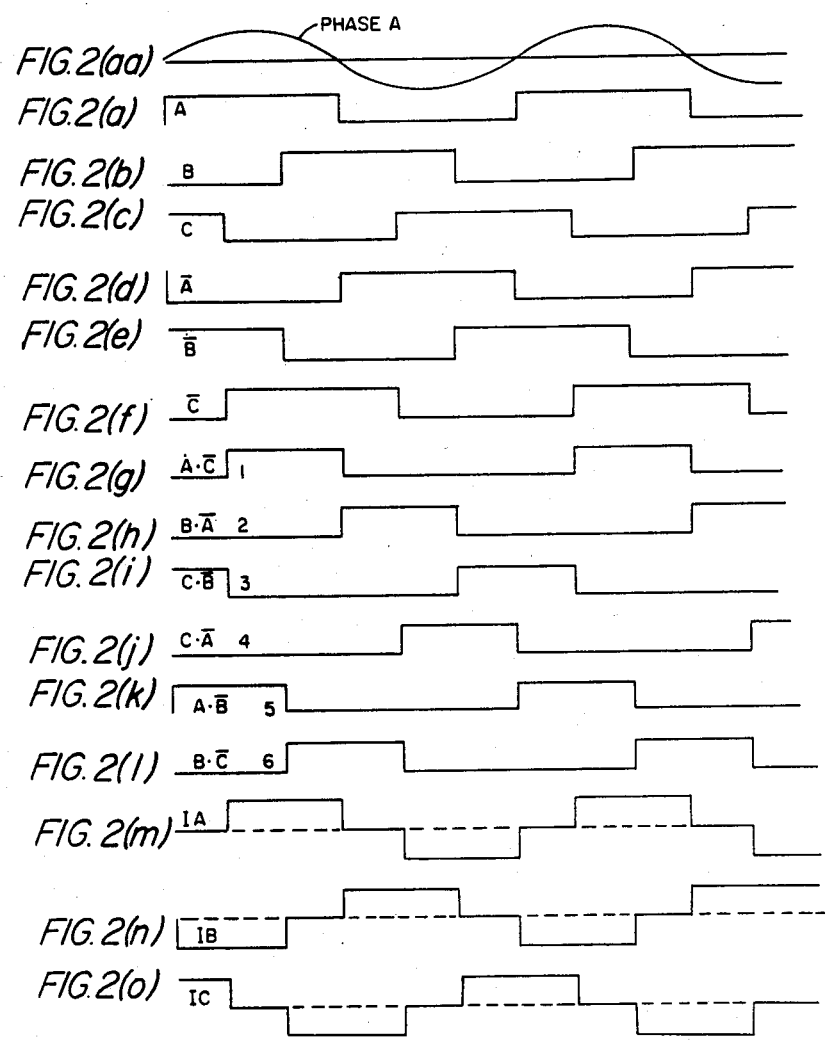

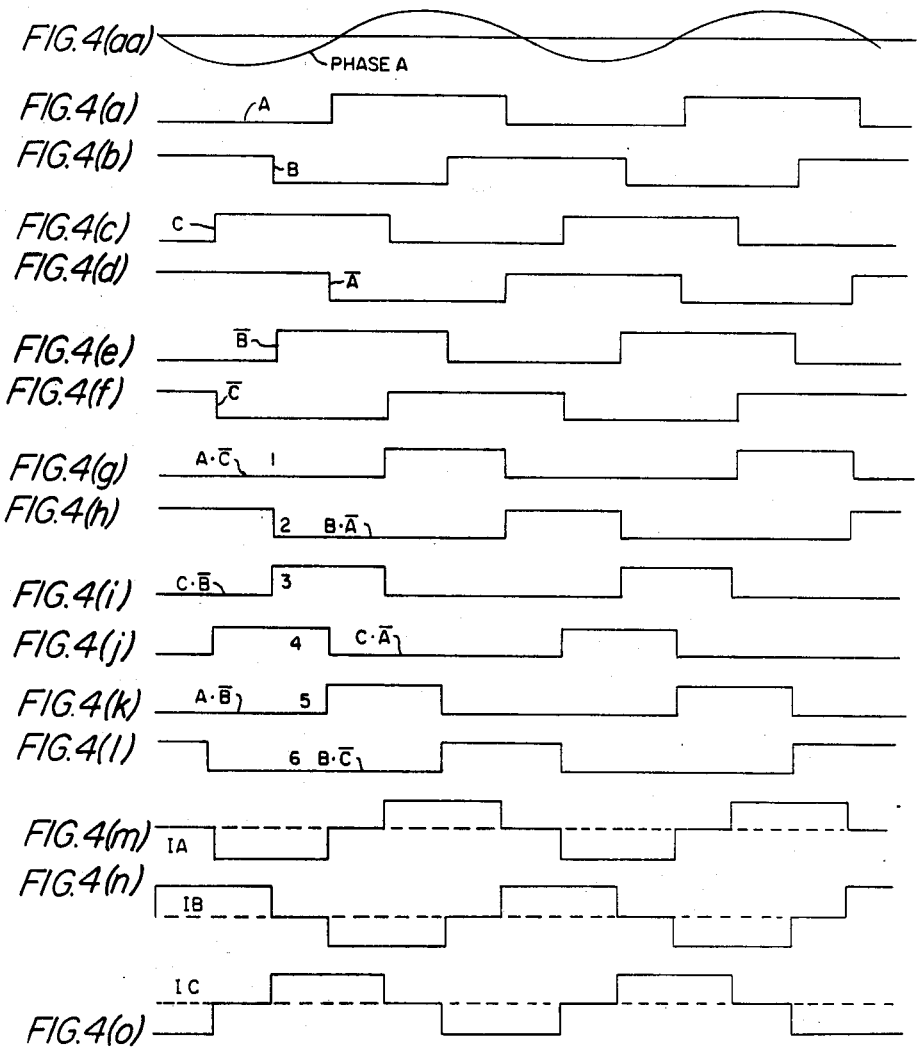

FOUR QUADRANT CONTROL CIRCUIT FOR A BRUSHLESS THREE-PHASE D.C. MOTOR

ORIGIN OF THE INVENTION

This invention described herein was made by an employee of the United States Government and may be manufactured and used by or for the Government of the United States for governmental purposes and without the payment of any royalties thereon or therefor.

FIELD OF THE INVENTION

The invention relates to a motor control system for a three-phase permanent magnet brushless d.c. motor and more particularly, to a system providing four quadrant control of such a motor.

BACKGROUND OF THE INVENTION

As discussed hereinbelow, the invention is particularly concerned with, but is no way limited to, use in connection with tethered satellites being developed by the National Aeronautics and Space Administration (NASA). Such a tethered satellite, when released from the space shuttle carrying the satellite, serves as a source of potential energy. In particular, the gravity gradient between the satellite and the shuttle to which the satellite is tethered creates a tension in the tether. The latter is attached to a motor-driven reel and the mechanical energy produced, which is a function of tension times speed, must be converted into electrical energy by the motor-generator which drives and is driven by the reel. Moreover, on station, the motor must continually modulate the rate of movement of the satellite to achieve stability. This requires an inherent transition in the operation of the motor-generator between motor and generator operation and vice versa. The motor-generator functions as a motor to retrieve the satellite.

As will become apparent, the system of the invention is equally applicable to the bi-directional control of large inertia loads such as reaction wheels, energy storage flywheels, and electromechanical actuators for vane and elevon control. More generally, the system of the invention is applicable to situations wherein the motor must provide sudden stopping and reversal of load, e.g., in connection with cranes, industrial robots and the like.

Prior to the invention, two-phase brushless d.c. motors have been used when four quadrant control is required. There are a number of advantages of three-phase motor over a two-phase motor. For example, a two-phase motor requires one-third more power handling components than a three-phase motor. Further, the bandwidth of the current loop in a two-phase motor is determined by the number of poles and the speed, and this bandwidth may be greater than 1000 Hz in a high speed motor. With a three-phase motor (as with a conventional brush type motor), the bandwidth is determined by the system driven by the motor and this bandwidth is often less than 20 Hz.

SUMMARY OF THE INVENTION

Generally speaking, the present invention is concerned with four quadrant control of a threephase permanent magnet brushless d.c. motor from a single input command. The control circuit provided permits the motor to accelerate in clockwise direction, brake or generate in a clockwise direction, accelerate in a counterclockwise direction, and brake or generate in a counterclockwise direction. In the braking mode, the control circuit converts mechanical energy into electrical energy. Energy in excess of system losses is fed to the line where this energy may either be returned to the source, fed to other loads of the system or dissipated in a dummy load.

In accordance with a preferred embodiment of the invention, a control circuit is provided which permits four quadrant control of a three-phase motor-generator and which comprises a bridge circuit including a pair of control transistors connected to each of the three-phase windings of the motor-generator, switching control means for receiving input signals related to the rotational position of the motor-generator and for controlling switching of the transistors in accordance therewith such that each of said transistors, during normal operation of the motor-generator as a motor, is switched on for a 120° period and one of the transistors of each transistor pair is switched off when the other transistor of that pair is switched on, in accordance with conventional systems. The switching control means further includes switching means for alternately switching the transistors of each transistor pair on and off a plurality of times during a further operational period wherein said motor-generator operates as a generator, the duration of the further operational period also being typically 120°.

In accordance with an important feature of the invention, the switching control means further comprises means for sampling the current in each leg of the bridge circuit. This sampling means advantageously includes an electronic switch connected to each of the transistor pairs and means for providing selectively closing of each of electronic switches during the on period of a predetermined transistor (e.g., the lower transistor) of the corresponding transistor pair. The sampling means preferably includes a resistor connected in series with the collector-emitter path of the predetermined transistor and the sampling means samples the voltage across said resistor.

In accordance with a further important feature of the invention means are provided for deriving a feedback current signal from the bridge circuit. A current command signal is provided and the current feedback signal is summed by summing means with the current command signal to provide an input signal to the switching means. The switching means preferably comprises a pulse width modulator which receives, as a further input thereto, a periodic (typically triangular) wave of a predetermined frequency. This particular feature of the invention further involves the provision of polarity changing means for changing the polarity of the current feedback signal to provide negative feedback regardless of the polarity of the voltage of the current command signal. Preferably, the polarity changing means includes an input connected to the current sampling resistors and a further input connected to the output of the summing means.

Other features and advantages of the invention will be set forth in, or apparent from, the detailed description of a preferred embodiment which follows.

BRIEF DESCRIPTION OF THE DRAWINGS

FIG. 2(aa) to 2(o) are waveforms associated with the circuit of FIG. 1 used as background in explaining the operation of the control circuit of the invention;

FIGS. 4(aa) to 4(o) are further waveforms used in explaining the operation of the control circuit of the invention.

DESCRIPTION OF A PREFERRED EMBODIMENT

Figure 1:
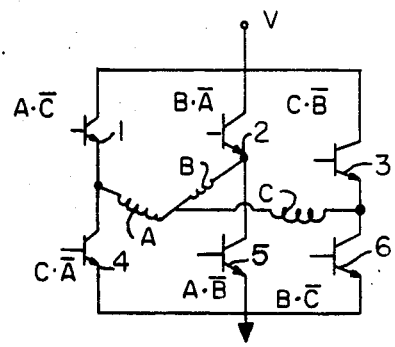
FIG. 1 is a schematic diagram of the basic components of a transistor control system for a three-phase motor.

Referring to FIG. 1, a circuit diagram is shown of the basic components of a conventional control circuit for the phase windings of a threephase motor. The phase windings of the motor are indicated at A, B and C and six control transistors connected to this winding are denoted 1 to 6. The windings A, B and C are respectively connected between the emitter and collector circuits of respective transistor pairs 1 and 4, 2 and 5 and 3 and 6, as shown. The transistors 1 to 6 receive respective unique control signals, described in more detail below, to control switching thereof.

The waveforms for driving the motor are shown in FIGS. 2(aa) to 2(o). These waveforms are the standard waveforms for driving a three-phase motor and are shown for background purposes in explaining the motor operation.

In such a conventional motor, one position sensor (not shown) is aligned in the center of each phase of the motor to sense the position of the associated rotating magnet (not shown). Thus, as the magnet rotates, three position signals, each shifted 120° with respect to each other, are produced as shown in FIGS. 2(a), 2(b), and 2(c). The motor back emf of phase A is shown in FIG. 2(aa). It is noted that this back emf is in phase with the phase A position signal as shown in FIG. 2(a). Similarly, the phase B and C back emfs are respectively in phase with the outputs of the phase B and C position sensors.

The position sensor signals are inverted as described later, and the sensor output signals and the inverted output signals are combined in AND gates to be described in connection with FIG. 3 in a predetermined sequence to produce the waveforms shown in FIG. 2(g) through 2(l). Each of these signals is "high" for 120° out of each 360° period. The "high" portion of these six signals determines the "on" time of the six transistor switches 1 to 6 driven thereby as shown in FIG. 1. The resulting three-phase motor current is shown as IA, IB and IC in FIGS. 2(m), 2(n) and 2(o). It is noted that in FIG. 2(m), for a 120° period, the current is in phase with the back emf of phase A, shown in FIG. 1(aa). This indicates motor action. During braking, the current will be 180° out of phase with the back emf, indicating generator action.

It is also noted that at any one instant, current is being conducted by only one diagonal pair of transistors (transistors 1 and 4, or 2 and 5 or 3 and 6). The winding excitation configuration changes every 60 electrical degrees of shaft rotation. For example, during the 120° period when the signal A·C̄ is high (FIG. 1(g)), the signal A·B̄ is high for 60° of this period (FIG. 2(k)) and B·C̄ is high for the other 60° period (FIG. 2(l)). Current is conducted first through transistors 1 and 5 (FIG. 1) for 60° and then through transistors 1 and 6 for 60°, resulting in the positive portion of current IA shown in FIG. 2(m). Since there is only one current path for any given 60° period, the description will be limited to the operation of the circuitry for only that period, it being understood that this description is valid for all other periods.

Figure 3:
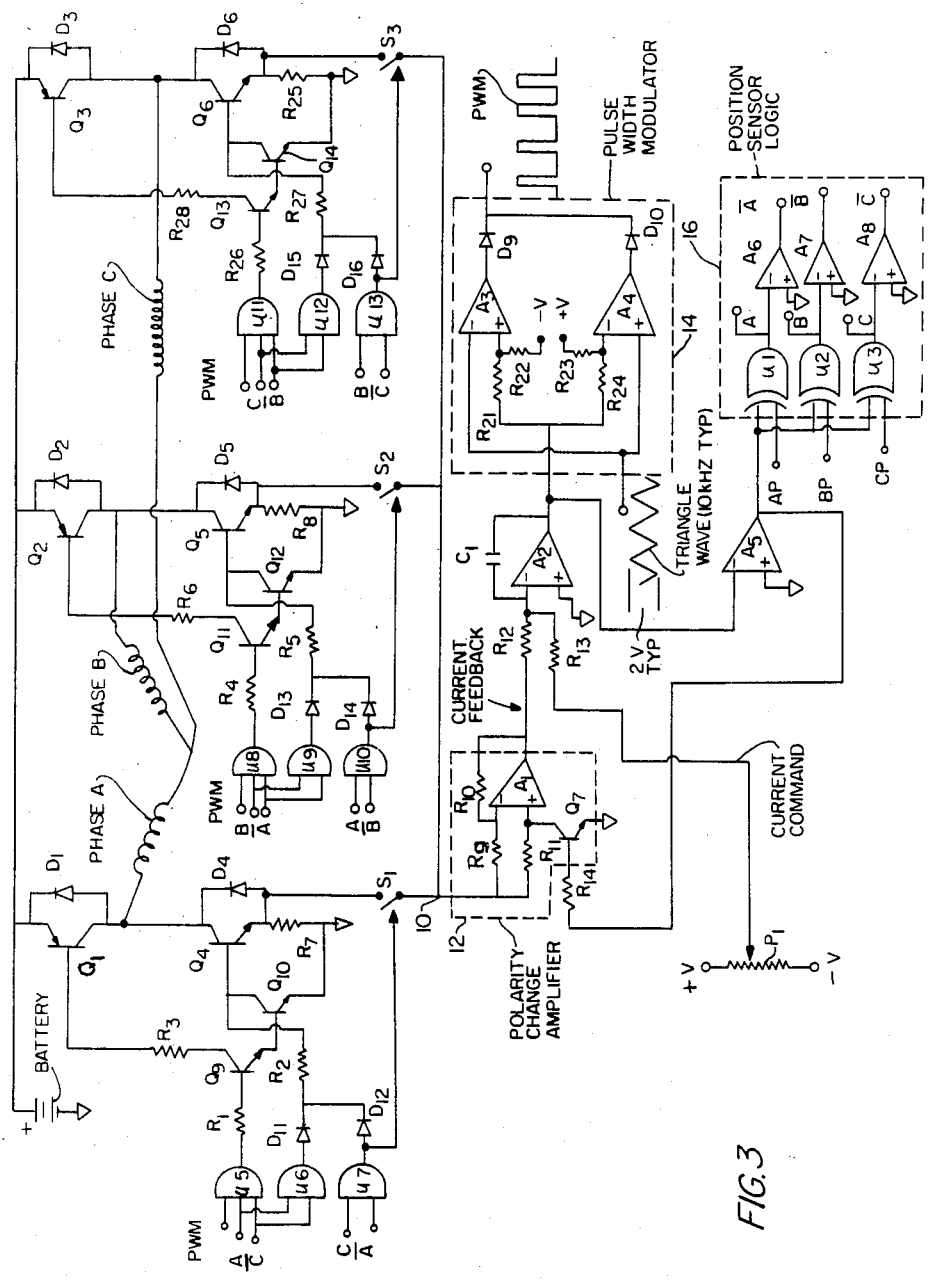
FIG. 3 is a schematic circuit diagram of a presently preferred embodiment of the control circuit of the invention.

Referring to FIG. 3, there is shown a schematic diagram of the control system of the invention Transistors Q1 through Q6 correspond to transistors 1 through 6, respectively, of FIG. 1. It will be appreciated that such additional components as cascaded transistor stages, which increase the power capacity of the circuit, have been omitted in FIG. 3 for purposes of clarity.

The transistors pair Q1 and Q4, and associated shunt diodes D1 and D4, are connected as shown in a control circuit including transistors Q9 and Q10, input AND gates U5, U6, and U7, resistors R1, R2, R3 and R7, and further diodes D11 and D12. A similar control comprising transistors Q11 and Q12, AND gates U8, U9 and U10, resistors R4, R5, R6 and R8 and diodes D13 and D14 is provided for transistor pair Q2 and Q5, and shunt diodes D2 and D5, respectively, are connected thereacross. Similarly, a like control circuit comprising transistor pair Q13 and Q14, AND gates U11, U12 and U13, resistors R25, R26, R27 and R28 and diodes D15 and D16 is provided for transistor pair Q3 and Q6, and diodes D3 and D6, respectively, are connected thereacross. The respective control circuits also include switches S1, S2 and S3 which are connected to the junction between the current sampling resistors R7, R8, R25 and emmitters of respective transistors Q4, Q5 and Q6 to a common point 10 which forms one input to a polarity change amplifier 12 described below. The output of polarity change amplifier 12 is connected through a resistor R12 to the negative input of an operational amplifier A2. The tap of a current command potentiometer P1 is connected through a resistor R13 to the same input while a capacitor C1 is connected between that input and the output of operational amplifier A2. The output of operational amplifier A2 is connected to the input of a pulse width modulator circuit 14 which is described in more detail below, and to the negative input of a further operational amplifier A5. The output of the latter is connected to a position sensor logic circuit 16 described in more detail below, as well as back to polarity change amplifier 12.

With this general overview of the connections between the various circuits and circuit components of the system, the nature and function of the circuits making up the system will be considered, starting with some of the conventional circuits which are employed as part of the system.

Polarity change amplifier 12 comprises, as illustrated, an operational amplifier A1, a transistor switch Q7, and resistors R9, R10 and R11. If transistor switch Q7 is "on" (base high), the gain of the amplifier A1 is minus 1. If transistor switch Q7 is "off" (base low) the gain of the amplifier A1 is plus 1.

The pulse width modulator circuit 14 comprises a pair of operational amplifiers A3 and A4, a pair of diodes D9 and D10, and four resistors R21, R22, R23 and R24, and is an absolute value pulse width modulator. A triangle-shaped wave, typically at 10 kHz, is fed to the plus input of amplifier A4 and to the minus input of the other amplifier A3. Bias voltages equal to the peak amplitude of the triangle wave are applied to the other inputs through resistors R21, R22, and R23, R24 such that when the output of an input amplifier A2 is zero, the output of both amplifiers A3 and A4 are low, resulting in zero pulse width. Thus, as the output of amplifier A2 increases, in either a positive or negative sense, a pulse train will be generated at the junction of diodes D9 and D10, this pulse train being indicated as PWM in FIG. 3. The pulse width of the pulses of pulse train PWM is proportional to the output of amplifier A2 regardless of its polarity. Diodes D9 and D10 prevent amplifiers A3 and A4 from loading each other. Pulse train PWM is "AND"ed with the signal A·$\overline{\text{C}}$ in an AND gate U5, with signal B·$\overline{\text{A}}$ in an AND gate U8 and with C·$\overline{\text{B}}$ in AND gate U11 to control the turn on time of transistors Q1 through Q6, which varies the applied voltage to the motor as a function of speed and commanded current.

The signals A,B,C and $\overline{\text{A}}$, $\overline{\text{B}}$, $\overline{\text{C}}$ are derived using position sensor logic circuit 16. This circuit includes three "exclusive OR" circuits or gate U1, U2 and U3. As is well known, the logic provided by such gates is as follows: if both inputs are the same, i.e., either 0,0 or 1,1, the output will be low or 0. If both inputs are different, either 0, 1 or 1, 0, the output is high or 1. These gates are, of course, standard integrated circuits. Inverters A6, A7 and A8 are standard inverter circuits and invert the motor position sensor outputs derived from the motor position sensor signals appearing at motor position sensor input terminals AP, BP, and CP.

Switches S1, S2, S3 are standard solid state switches and are connected as shown between the respective circuits associated with the respective pairs of transistors Q1, Q4 and Q2, Q5 and Q3, Q6, and the input to polarity change amplifier 12. If the control line, indicated by the arrow on the left of each switch, is high, the switch is closed If the control line is low, the switch is open. Gates U5 to U13 are standard "AND" gates and as is well known, the output of an "AND" gate is high only if all of its inputs are high, and if any input is low, its output is low or zero.

The direction of rotation of a brushless three-phase motor is reversed by reversing the polarity of or by inverting the signals from the three motor position sensors (not shown) appearing at terminals AP, BP, CP. This inverting is done electronically by the three "exclusive OR" gates U1, U2, U3. If the output of operational amplifier A5 is low, the three outputs of the "exclusive OR" gates will be shown in FIGS. 2(a) 2(b) and 2(c). If the output of operational amplifier A5 is high, then all three signals will be inverted, as shown in FIGS. 4(a), 4(b) and 4(c) because of the logic previously described.

The inverted waveforms shown in FIGS. 4(g) to 4(l) correspond to the opposite direction of rotation to that for FIGS. 2(g) to 2(l). If the same time base is used for the two sets of figures, it is noted that the phase A back emf, FIGS. 1(aa) and FIG. 4(aa), are 180° out of phase with respect to each other and that the three-phase currents, shown in FIGS. 2 (m), (n), and (o) and FIGS. 4(m), (n) and (o), are respectively 180° out of phase with respect to each other. This indicates the opposite direction of rotation depicted by the waveforms of the two figures.

The overall circuit operation, together with significant features of this invention will now be described. An important feature of the invention concerns the method by which the "on" and "off" periods of the power transistors Q1 to Q6 are controlled. In the prior art circuit of FIG. 1, while a transistor in the top row is being pulse width modulated for a 120° period of shaft rotation, the lower transistor in the same leg, i.e., of the same transistor pair, remains off for the entire 120° period. As indicated for example, in FIG. 2(g) and FIG. 2(j), the lower transistors, i.e. transistors 4, 5 and 6, are turned on for a full 120° period which begins 60° after the cessation of the on period for the corresponding upper transistor, i.e., transistors 1, 2 or 3, in the same leg.

In accordance with the invention, the lower transistors, i.e., transistors Q4, Q5 and Q6 are also turned on for this same 120° period but in addition to this on period, these transistors are also switched off and on at the PWM frequency during the 120° period when the upper transistor in the same leg is being respectively switched on and off. The need for, and the advantages of, this approach will become apparent as the operation is described.

Considering a specific example, the two on periods for transistor Q4 are controlled by gates U6 and U7 which are "OR"ed together by diodes D11 and D12. It is noted that gate U6 receives the same inputs (except for input PWM) as gate U5 which controls transistor Q1. The output of gate U6 remains high for the full 120° period of A·$\overline{\text{C}}$ thereby providing base current for transistor Q4 while the output of gate U5 is being switched at the PWM frequency for the same 120° period to control the on time of transistors Q9 and Q1. When the output of gate U5 goes high during the PWM interval, current flows into the base of transistors Q9 and Q10, turning both on. Transistor Q10 diverts the base current being supplied to transistor Q4 to ground which turns off Q4. Current supplied from gate U6 through current limiting resistor R2 is shunted to ground through transistor Q10. Transistor Q9 is on, allowing base current from transistor Q1 to flow through resistor R3 which turns transistor Q1 on. When the output of gate U5 goes low during the PWM interval, there is no base current path for transistors Q9 and Q10, and both turn off. This turns transistor Q1 off. The output current from gate U6, which remains high for the entire 120° period is allowed to flow into transistor Q4 which turns transistor Q4 on. Thus, transistors Q1 and Q4 alternately switch at the PWM frequency, one being on while the other is off, and vice versa. As will become apparent, this operation results in automatic transition from motor to generator operation and from generator to motor operation.

Another significant feature of the invention concerns the manner in which a continuous feedback signal is provided which is proportional to motor current and which has a polarity consistent with the current command input, provided by potentiometer P1, such that negative feedback results. Current is sensed as a function of the voltage across the resistors R7, R8, R25 in each leg of the bridge. The values of these resistors are typically in the milliohm range. Only the voltage across one resistor is sensed at any one instant. The sensed resistor is determined by which switch of the switches S1 or S2 or S3 is closed. When gate U7 is high, switch S1 is closed, as shown in FIG. 2(j) and FIG. 4(j). Similarly, switch S2 is closed when gate U10 is high, as shown in FIG. 2(k) and FIG. 4(k), and switch S3 is closed when gate U13 is high, as shown in FIG. 2(l) and FIG. 4(l).

The circuit operation will now be described. Amplifier A5 functions as a zero crossing detector. When the voltage at its input is greater than zero volts, its output will be fully low. When this input voltage is less than zero volts, the output of amplifier A5 will be fully high. The interval denoted by signal A·C̄, and shown in FIG. 2(g) will now be examined.

First, assume a negative current command voltage from potentiometer P1 is applied to amplifier A2 through gain set resistor R13. Since this voltage is applied to the inverting input of amplifier A2, the output thereof will go positive. A positive voltage applied to the inverting input of amplifier A5 makes the output thereof go low which sets each of the gates U1, U2, U3 in the noninverting state and thus the waveforms of FIG. 2 apply. The low output of amplifier A5 is also applied to the base of transistor switch Q7 through current limiting resistor R14 which causes switch Q7 to be in an off state. As was previously described, when transistor Q7 is off, the gain of amplifier A1 will be plus one. The output of amplifier A1 determines the polarity of the current feedback signal and is applied to resistor R12, where the signal is summed with the current command voltage signal from potentiometer P1. It will be shown that the polarity of the signal from potentiometer and the polarity of the output of amplifier A1 will always be of opposite sign, thereby indicating negative feedback.

As stated, a negative voltage from potentiometer P1 causes the output of amplifier A2 to go positive. This causes the pulse train, indicated at PWM, to be generated which has a pulse width proportional to the amplitude of the output of A2. This pulse train is applied to gate U5 and during the interval under examination, i.e., the interval of signal A·C̄, will turn transistor Q1 on and off at the PWM frequency. It is noted that transistor Q5 is on for a full 60° of the A·C̄ interval as indicated in FIG. 2(k). When transistor Q1 is on, current flows from the battery, through transistor Q1, phase winding A, phase winding B, transistor Q5, resistor R8, and ground back to the battery.

When transistor Q1 switches off, energy stored in the inductance of the motor causes the current to continue to flow through phase winding A, phase winding B, transistor Q5, resistor R8, ground, resistor R7 and diode D4 back to phase winding A. Thus, the winding current is continuous even though the battery current is pulsed. Since the winding current is continuous, the voltage across resistor R8, which is proportional to current, is continuous. The voltage across resistor R7 was not continuous, is unwanted in these considerations, and is not sensed because switch S1 is open. Switch S2 is the only switch closed during the interval, as indicated in FIG. 2(k). The current flowing downward in resistor R8 makes the sensed voltage positive with respect to ground. This positive voltage is fed through switch S2 to amplifier A1, which, for the conditions described, has a gain of plus one. Therefore, a positive voltage proportional to current is fed to resistor R12 where this voltage is summed with the command voltage, which is negative, thereby resulting in negative feedback. The exact amplitude of the current is determined by the amplitude of the voltage of potentiometer P1 and the values of resistors R8, R12, and R13. The polarity of the current is determined by the sign of the voltage from potentiometer P1.

As the speed of the motor increases, the back emf at the input terminals of the winding phase A increases in a positive direction. This emf opposes the battery voltage and tends to reduce the current being driven into phase winding A through transistor Q1. The tendency for current to decrease is sensed by a drop in voltage across resistor R8 which is applied to resistor R12 where this drop is summed with the command voltage from potentiometer P1 applied to resistor R13. Amplifier A2 is a high gain (essentially infinite at low frequency) amplifier, and senses and amplifies the difference in the two voltages. The output of amplifier A2 increases to increase the pulse width, thereby increasing the applied voltage to the motor as the back emf increases to force the current to remain at the commanded value regardless of speed. Thus, the first quadrant operation is described. It is noted that capacitor C1 serves only to filter the high frequency ripple caused by the PWM current.

Turning now to the second quadrant operation, the motor is now turning at high speed where, for the interval A·C̄ being considered, the back emf will be positive at the input terminal to phase winding A. As the voltage from potentiometer P1, which is negative, is reduced, the current will decrease proportionally as the output of amplifier A2 and the pulse width decrease. When the output of potentiometer P1 is at zero volts, the output of amplifier A2 tends to decrease further, reducing the pulse width and the on time of transistor Q1. It will be recalled, however, that when transistor Q1 switches off, transistor Q4 switches on. This provides a current path for the back emf through transistor Q4, resistor R7, ground, resistor R8, diode D5, phase winding B, and phase winding A. Switch S2 is the only switch closed during this interval applying the voltage drop across resistor R8 to amplifier A1. Since the current flow is "upward" through resistor R8, the sensed voltage is negative with respect to ground. Since the gain of amplifier A1 is plus one, this negative voltage is applied through resistor R12 to operational amplifier A2 and makes the output of amplifier A2 remain positive at a level which will produce a pulse width drive to transistor Q1 which then applies a battery voltage equal and opposite to the back emf, and results in zero current as being commanded by potentiometer P1. The motor is now coasting.

Assuming now that a positive voltage is commanded by potentiometer P1 calling for generator current to flow, the output of amplifier A2 initially remains positive as described above. The output of amplifier A5 remains low and transistor Q7 remains off. The gain of amplifier A1 will therefore remain plus one for the A·C̄ interval being considered.

The positive voltage from potentiometer P1 applied to the minus input of amplifier A2 causes the output amplifier of A2, which is still positive because of the above described operation, to decrease. This decreases the pulse width of the pulses applied to transistor Q1, which decreases its on time and increases the on time of transistor Q4 to produce the current being commanded by potentiometer P1. It will be recalled that there is a positive back emf at the input of winding phase A and thus when transistor Q4 switches on, current flows through transistor Q4, resistor R7, ground, resistor R8, diode D5, phase winding B, and phase winding A. When transistor Q4 switches off during the PWM interval, energy stored in the winding inductance forces the current to continue to flow out of phase winding A, through diode D1, the battery, ground, resistor R8, diode D5, phase winding B, and back to phase winding A. Thus, braking energy in excess of losses is returned to the source. It is noted the current through resistor R8 is continuous and is sensed as negative with respect to ground. Switch S2 is the only switch closed during the interval being considered. This negative current proportional signal is fed to amplifier A1 which has a plus one gain. Thus, a minus voltage is applied to resistor R12. This is consistent with negative feedback since the signal from potentiometer P1 is positive.

As the speed and back emf (which is proportional to speed) continue to decrease, the output of amplifier A2 will decrease to decrease the pulse width thereby causing transistor Q4 to remain on longer in the PWM interval to produce the generator current being commanded. This completes the description of the second quadrant operation.

Finally, a low speed will be reached where the current generated by the back emf, because of system losses, will just be sufficient to satisfy the commanded current. At this point, the output of amplifier A2 has reduced to zero, resulting in zero pulse width. Transistor Q4 will be on, shunting the back emf for the entire A·C interval and no energy will be returned to the battery. At this point, the input energy is equal to the system losses. As the speed decreases further, and the back emf reduces, the commanded current can no longer be maintained by the back emf thereby causing the output of amplifier A2 to go negative. This output is applied to the minus input of amplifier A5 causing the output thereof to go high. This inverts the outputs of gates U1, U2, U3 and causes current to flow in the opposite direction. The waveforms for the intervals now being investigated are those shown in FIG. 4(h) as applied to transistor Q2 and FIG. 4(j) as applied to transistor Q4. The high output of amplifier A5 turns transistor switch Q7 on. The gain of amplifier A1 is therefore minus one for interval, shown in FIG. 4(h), being considered.

The negative output of amplifier A2 causes a pulse train PWM out of pulse width modulator 14 which is now applied to transistor Q2. Transistor Q4 is also on for 60° of the interval during which transistor Q2 is on. The same amplitude of current that was flowing in phase winding A and phase winding B prior to the zero crossing of the output of amplifier A2 continues to flow after the zero crossing of the output of amplifier A2. However, the low speed back emf which was not sufficient to supply the commanded current is now being aided by the battery voltage. When transistor Q2 switches on during the PWM interval, current flows from the battery, through transistor Q2, phase winding B, phase winding A, transistor Q4, resistor R7, and ground, back to the battery. When transistor Q2 switches off in the PWM interval, current continues to flow through phase winding B, phase winding A, transistor Q4, resistor R7, ground, resistor R8 and diode D5 back to phase winding B. The current is now continuous through resistor R7. Switch S1 is the only switch closed during the interval, feeding the positive voltage sensed on resistor R7 to amplifier A1. As discussed above, amplifier A1 has a gain of minus one and inverts the voltage across resistor R7 to apply a minus voltage to resistor R12. It will be recalled that the voltage from potentiometer P1 is now positive, the negative voltage at resistor R12 is consistent with negative feedback.

Finally, the motor reaches zero speed and reverses direction of rotation. When the motor does this, the back emf becomes positive at the input terminal to phase winding B. This opposes the battery voltage being applied by transistor Q2 and tends to lower the commanded current. This is sensed by resistor R7 and hence by amplifier A2 and the output thereof becomes more negative. This increases the pulse width, which turns transistor Q2 on for a longer period, thereby increasing the applied voltage as the speed increases to maintain the current at the commanded value. This completes the description of the third quandrant operation.

Once again, if the voltage from potentiometer P1 is returned to zero volts, the tendency is for the pulse width to decrease, which reduces the on time of transistor Q2 and increases the on time of transistor Q5. Current tries to flow from phase winding B through transistor Q5, resistor R8, ground, resistor R7, diode D4, and phase winding A back to phase winding B. Switch S1 is the only switch closed. The sensed voltage across resistor R7 is negative. This is inverted by amplifier A1 and fed as a positive signal to resistor R12. This maintains amplifier A2 at a negative output level such that the PWM signal will provide an on time for transistor Q2 such as to apply a forward voltage equal and opposite to the back emf to thereby maintain the current at the zero commanded value.

The signal from potentiometer P1 is now made negative, thereby commanding a braking or generator current. Both the input voltage from potentiometer P1, and the output of amplifier A2 are negative. Amplifier A5 remains in a high state which maintains transistor Q7 in an on state. Thus the gain of amplifier A1 remains minus one for the interval being considered, which is that shown in FIG. 4(h).

The negative voltage from potentiometer P1 causes the output of amplifier A2 to decrease toward zero which causes the pulse width to decrease the on time of transistor Q2. The back emf will now be greater than the applied battery voltage. When transistor Q5 switches on in the PWM interval, current flows out of phase winding B through transistor Q5, resistor R8, ground, resistor R7, diode D4, and phase winding A back to phase winding B. When transistor Q5 switches off, current continues to flow out of phase winding B, diode D2, the battery, ground, resistor R7, diode D4, phase winding A, back to phase winding B. Switch 1 is the only switch closed during the interval and the continuous voltage across resistor R7 is sensed. The voltage is sensed as being negative with respect to ground. This sensed voltage is inverted by amplifier A1 and fed back as a positive voltage to resistor R12 where the voltage is summed with the negative command voltage from potentiometer P1. Thus, negative feedback results.

As the speed and back emf continues to decrease, the output of amplifier A2 decreases toward zero to decrease the pulse width and increase the on time of transistor Q5 to maintain the current at the commanded value. A low speed will be reached where amplifier A2 is at zero volts and transistor Q5 will be on 100% of the PWM interval to maintain the commanded current. This completes the description of the fourth quadrant operation.

As the speed continues to decrease, the back emf is not sufficient to maintain the commanded current. The drop in current causes the output of amplifier A2 to go positive. The output of amplifier A5 then goes low, the outputs of gates U1, U2, U3, go to the noninverted state where the waveforms of FIG. 2 apply, the gain of amplifier A1 becomes plus one, and the system is now operating in the first quadrant. Thus, operation in all four quadrants has been described.

From the foregoing discussion, it will be appreciated that a significant feature of this invention is the technique of driving the lower bridge transistors Q4, Q5 and Q6 for two separate 120° periods. One period is for conventional commutation of a brushless three-phase motor. The second allows the bottom or lower transistor to be switched on and off alternately with the upper transistor in the same leg for commutation as a generator.

A second important feature of the invention concerns the provision of sampling the current in each leg of the bridge. A switch which is closed during the normal commutation period of the lower transistor samples the desired resistor voltage.

Another further significant feature concerns changing the polarity of the feedback signal to provide negative feedback regardless of the polarity of the command voltage. The polarity of the output of amplifier A2 which is determined by the sum of the command and the feedback is used to determine the polarity of the feedback voltage.

Figure 5:
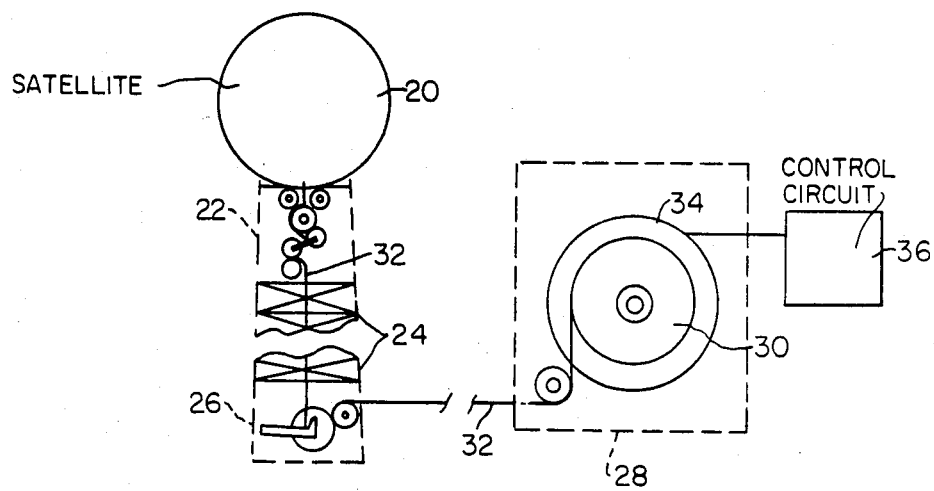
FIG. 5 is a schematic diagram of a tethered satellite incorporating the motor control circuit of the invention.

As discussed above, one application of the motor control system of the invention is to tethered satellites systems being developed by NASA. Tethered satellites are discussed, for example, in the article "Tethered Satellite Control Mechanism" by Gilbert M. Kyrias, the contents of which are hereby incorporated by reference. The basic components of one embodiment of a tethered satellite system are shown in a highly schematic manner in FIG. 5. The system includes a satellite 20, an upper boom tether control mechanism 22 (which includes a tether grip pulley and a fine tensionmeter), a deployment boom 24, and lower boom mechanism 26, and a reel drive mechanism 28. The latter includes a reel 30 for a cable or tether 32 which is connected through the other mechanisms to the satellite 20, as shown. A motor 34 drives reel 30 and a motor control circuit 36 corresponding to that discussed above controls motor 34. It will be understood that the components of the tethered satellite system indicated schematically in FIG. 5 are fully described in the article referred to above and form no part of the invention.

As discussed above, the satellite 20, when released from the craft on which it is carried, viz., the Space Shuttle, constitutes a source of potential energy. The gravity gradient between the satellite and the shuttle creates a tension in the tether 32 attached to the reel 30 driven by the motor which, as noted above, is indicated schematically at 34 and which serves as a motor-generator. The mechanical energy, which is a function of the tension times the speed, is converted by motorgenerator 34 into electrical energy under the control of motor control unit 36. When the system is "on station", the motor 34 continually modulates the rate of the satellite 20 to achieve stability, thereby requiring transition from motor to generator operation and vice versa. The system functions as a motor to retrieve the satellite.

As stated above, the invention is also applicable to the bi-directional control of large inertial loads such as reaction wheels, energy storage flywheels, and electro-mechanical actuators for vane and elevon control. The invention is also applicable to systems wherein sudden stopping or reversal of a load occur, such as cranes and industrial robots.

Although the invention has been described relative to an exemplary embodiment thereof, it will be understood by those skilled in the art that various and modifications on this embodiment can be effected without departing from the scope and spirit of the invention.

I claim:

1. A control circuit for providing four quadrant control of a three-phase brushless d.c. motor-generator including a rotor, said control circuit comprising a bridge circuit including a pair of control transistors connected to each of the three-phase windings of the motor-generator, switching control means for receiving input signals related to the rotational position of the rotor of the motor-generator and for controlling switching of said transistors in accordance therewith such that each of said transistors, during normal operation of the motor-generator as a motor, is switched on for a 120° period of each cycle and is switched off for the remainder of the cycle and one of the transistors of each transistor pair is switched off when the other transistor of that pair is switched on, said switching control means comprising means for sampling the current in each leg of the bridge circuit and including an electronic switch connected to each of said transistor pairs and means for providing selectively closing of electronic switches during the on period of a predetermined transistor of the corresponding transistor pair, and further including switching means for alternately switching the transistors of each transistor pair on and off a plurality of times during a further operational period of 120° during each cycle wherein said motor-generator operates as a generator, said circuit including current command signal generating means for providing a bi-polar current command signal, for controlling switching of said transistors, which transistors control the amount of current commanded and the polarity of which current command signal controls whether the motor-generator operates as a motor or generator.

2. A control circuit as claimed in claim 1 wherein said sampling means includes a resistor connected to in series with the collecter-emitter path of said predetermined transistor and wherein said sampling means samples the voltage across said resistor.

3. A control circuit as claimed in claim 1, further comprising means for deriving a feedback current signal from said bridge circuit and means for summing said current feedback signal and said current command signal to provide an input signal to said switching means.

4. A control circuit as claimed in claim 3 wherein said switching means comprises a pulse width modulator which receives as a further input thereto a triangle wave of a predetermined frequency, the transistors of each transistor pair being switched on and off at the output frequency of said pulse width modulator when said motor-generator operates as a generator.

5. A control circuit as claimed in claim 3 further comprising polarity changing means for changing the polarity of the current feedback signal to provide negative feedback regardless of the polarity of the voltage of the current command signal.

6. A control circuit as claimed in claim 5, wherein said polarity changing means includes one input connected to said bridge circuit and a further input connected to the output of said summing means.

7. A control circuit as claimed in claim 1 wherein said switching means comprises a pulse width modulator including a first input for receiving a negative feedback signal derived from said bridge circuit and related to the motor-generator current and a second input for receiving a periodic signal of relatively high frequency.

8. A control circuit for controlling a three-phase motor-generator including a rotor, said control circuit comprising a bridge circuit including a pair of transistors connected to each of the three-phase windings of the motor-generator, switching means for providing, during a first mode of operation, turning on of one of the transistors of each transistor pair during a 120° period of each cycle and turning off the remaining transistor of that transistor pair during the period when the one transistor of that transistor pair is turned on, and further means for providing, during a second mode of operation, turning said transistors of each pair of transistors alternately on and off a plurality of times during a 120° period of each cycle, said control circuit further comprising current command signal generating means for providing a bi-polar current command signal, for controlling switching of said transistors, which transistors control the amount of current commanded and the polarity of which current command signal controls whether the motor-generator operates as a motor or generator, said further means comprising a pulse width modular which includes a first input for receiving a current feedback signal proportional to motor current from the bridge circuit and a second input for receiving a periodic wave of predetermined frequency, said transistors of each pair of transistors being turned off and on during said second mode of operation at the output frequency of said pulse width modulator.

9. A control circuit as claimed in claim 8 further comprising switching means for controlling connection of the transistor pairs of the bridge circuit to said pulse width modulator such that a current feedback signal is received from only one transistor pair at a time.

10. A control circuit as claimed in claim 9 further comprising means for sampling the voltage in each leg of the bridge signal, to provide said current feedback signal, said switching means comprising an electronic switch to each of said transistor pairs and means for providing selective closing of each electronic switch during the on period of a predetermined transistor of the corresponding transistor pair.

11. A control circuit as claimed in claim 10 further comprising means for summing said bi-polar current command signal with said current feedback signal to provide an input signal to said first input of said pulse width modulator, and means for changing the polarity of said current feedback as necessary dependent upon the polarity of the current command signal to provide negative feedback regardless of the polarity of said current command signal.

12. In combination, a satellite, a reel, a tether for the satellite connected to the satellite at one end and wound around said reel at the other end, a three-phase motor-generator, including a rotor, for driving said reel during operation of the motor-generator as a motor and for driving by said reel during operation of the motor-generator as a generator, and a control circuit for said motor-generator, said control circuit comprising a bridge circuit including a pair of transistors connected to each of the three phase windings of the motor-generator, means for providing, during a first mode of operation, turning on of one of the transistors of each transistor pair during a 120° period of each cycle and turning off of the remaining transistor of that transistor pair during the period when the one transistor of that transistor pair is turned on, and further means for providing, during a second mode of operation, turning said transistors of each pair of transistors alternately on and off a plurality of times during a 120° period of each cycle, said further means comprising a pulse width modulator which includes a first input for receiving a current feedback signal proportional to motor current from the bridge circuit and a second input for receiving a periodic wave of predetermined frequency.

13. A control circuit as claimed in claim 12 further comprising switching means for controlling connection of the transistor pairs of the bridge circuit to said pulse width modulator such that a current feedback signal is received from only one transistor pair at a time.

14. A control circuit as claimed in claim 13 further comprising means for sampling the voltage in each leg of the bridge signal to provide said current feedback signal, said switching means comprising an electronic switch connected to each of said transistor pairs and means for providing selective closing of each electronic switch during the on period of a predetermined transistor of the corresponding transistor pair.

* * * * *